United States Patent
Higashiura et al.

(10) Patent No.: US 6,795,834 B2
(45) Date of Patent: Sep. 21, 2004

(54) APPARATUS, METHOD, AND STORAGE MEDIUM FOR FILE MANAGEMENT

(75) Inventors: Yasuyuki Higashiura, Kawasaki (JP); Takumi Kishino, Kawasaki (JP); Seigo Kotani, Kawasaki (JP); Takashi Yoshioka, Kawasaki (JP); Keizo Sato, Kawasaki (JP); Hiroki Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 09/748,372

(22) Filed: Dec. 27, 2000

(65) Prior Publication Data

US 2002/0002561 A1 Jan. 3, 2002

(30) Foreign Application Priority Data

Jun. 26, 2000 (JP) ........................................ 2000-190387

(51) Int. Cl.⁷ ........................... G06F 12/00; G06F 17/00
(52) U.S. Cl. ........................................ 707/204; 707/203
(58) Field of Search ................................ 707/204, 203

(56) References Cited

U.S. PATENT DOCUMENTS

| | | | | |
|---|---|---|---|---|
| 5,435,004 A | * | 7/1995 | Cox et al. | ................... 707/205 |
| 5,764,877 A | * | 6/1998 | Lomet et al. | ................... 714/6 |
| 6,189,016 B1 | * | 2/2001 | Cabrera et al. | |
| 6,324,548 B1 | * | 11/2001 | Sorenson | ................... 707/204 |
| 6,366,930 B1 | * | 4/2002 | Parker et al. | |
| 6,496,944 B1 | * | 12/2002 | Hsiao et al. | ................... 714/15 |
| 6,658,403 B1 | | 12/2003 | Kuroda et al. | |

FOREIGN PATENT DOCUMENTS

| | | |
|---|---|---|
| JP | 62-125452 | 6/1987 |
| JP | 3-224040 | 10/1991 |
| JP | 4-264655 | 9/1992 |
| JP | 5-73388 | 3/1993 |
| JP | 7-64782 | 3/1995 |
| JP | 7-325739 | 12/1995 |
| JP | 8-212142 | 8/1996 |
| JP | 9-160832 | 6/1997 |
| JP | 2-2679602 | 8/1997 |
| JP | 10-312329 | 11/1998 |
| JP | 11-249967 | 9/1999 |
| JP | 2-3041096 | 3/2000 |

* cited by examiner

*Primary Examiner*—Wayne Amsbury
*Assistant Examiner*—Cindy Nguyen
(74) *Attorney, Agent, or Firm*—Staas & Halsey LLP

(57) ABSTRACT

When a sweeping process and a backup process are performed on an electronic library file in an electronic library, a file storing a history of the sweeping process or a history of a backup process is generated, and the sweeping and the backup processes are managed. Thus, a user can easily manage as to which medium an original document has been swept to or where a backup copy of the original document is. If the uniqueness of the original document shown in a sweep history and a backup history can be secured, the problem that there can be a plurality of original documents on the storage media of a plurality of electronic libraries can be avoided.

52 Claims, 26 Drawing Sheets

| INTRA-ELECTRONIC-LIBRARY DOCUMENT INFORMATION | BACKUP DATA INFORMATION | | |
|---|---|---|---|
| | TIME STAMP | STORAGE MEDIUM | MEDIUM ID |
| A | 2000.03.01.12:20:01 | MO | ABCD |
| B | 2000.03.05.14:20:10 | MO | ABCD |
| C | 2000.03.10.17:15:30 | MO | EFGH |
| D | 2000.03.15.08:17:25 | MO | IJKL |
| E | 2000.03.20.10:23:27 | MO | IJKL |

F I G. 4

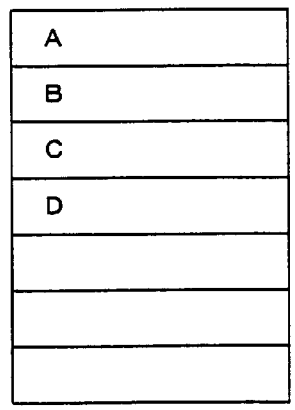
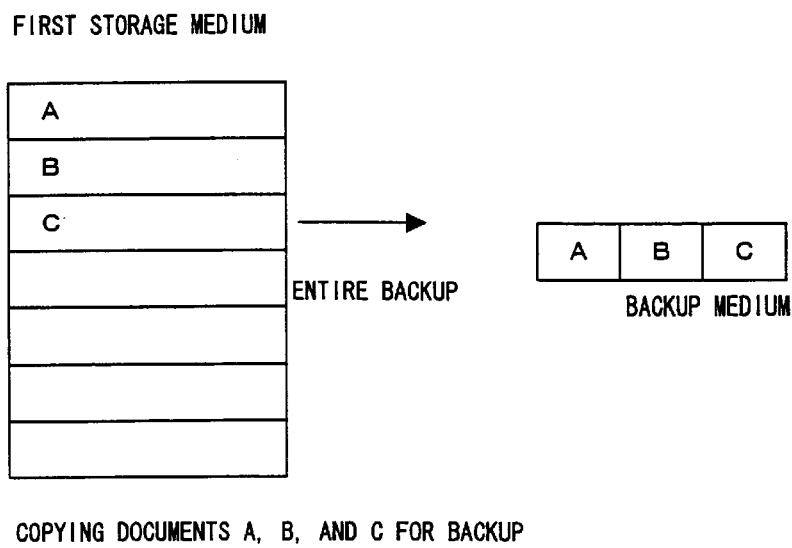
FIG. 5A
COPYING DOCUMENTS A, B, AND C FOR BACKUP
FIG. 5B
ADDING DOCUMENT D

FIRST STORAGE MEDIUM

SWEEPING DOCUMENTS A, B, AND C

ADDING DOCUMENT E

FIRST STRAGE MEDIUM
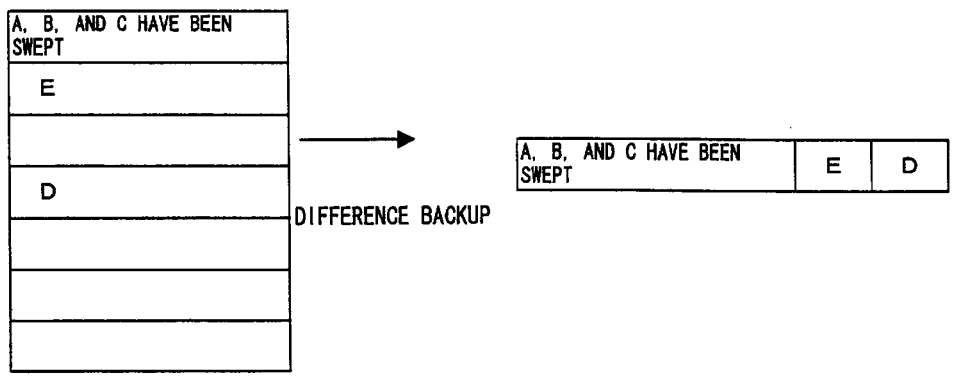
DIFFERENCE BACKUP
FIG. 7A
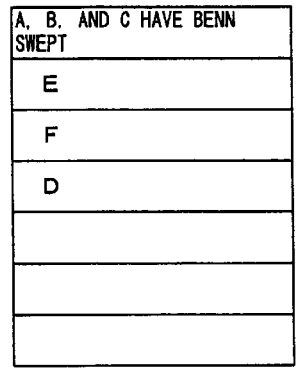
ADDING DOCUMENT F
FIG. 7B
DETECTING THAT TOTAL VOLUME OF A, B, C, D, E, AND F HAS EXCEEDED 70% OF DISK CAPACITY
REQUEST FOR ENTRY BACKUP
FIG. 7C

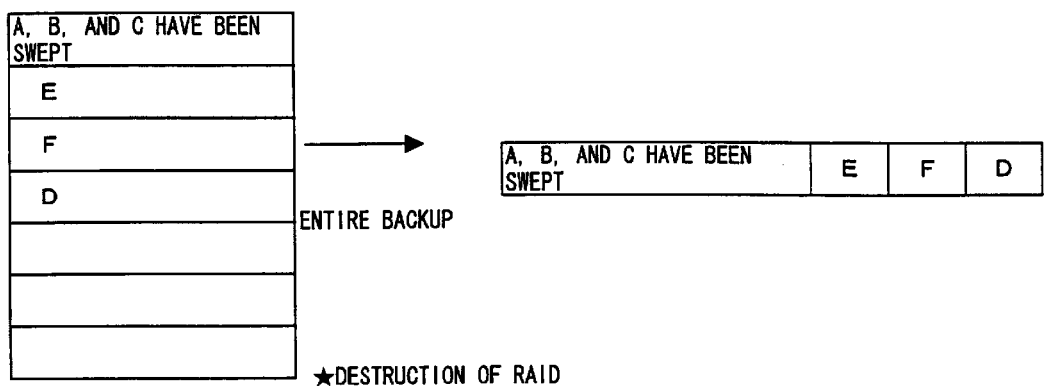
F I G. 8A
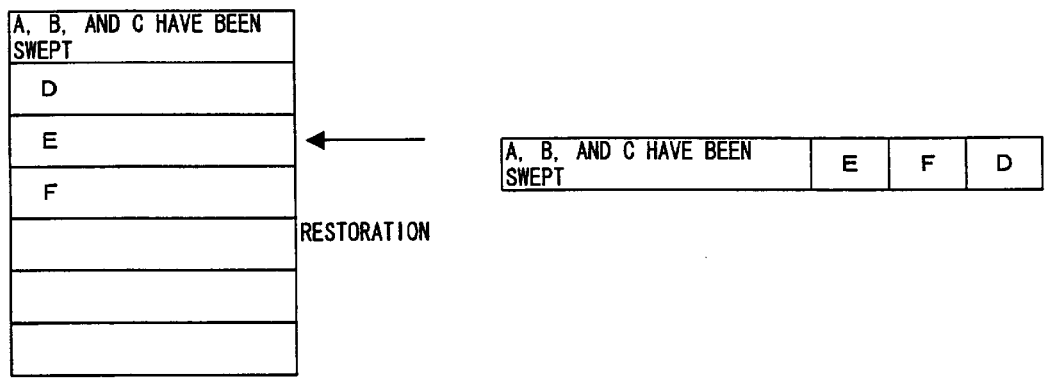
F I G. 8B

FIRST STORAGE MEDIUM

ENTIRE BACKUP

BACKUP MEDIUM

ADDING DOCUMENT G

FIRST STORAGE MEDIUM

SWEEPING DOCUMENTS A, B, AND C

ADDING DOCUMENTS H AND I

FIRST STORAGE MEDIUM
| A, B, AND C HAVE BEEN SWEPT |
|---|
| H |
| I |
| D |
| E |
| F |
| G |
| G | A, B, AND C HAVE BEEN SWEPT | H | I |
|---|---|---|---|
DIFFERENCE BACKUP
COPYING DATA FOR DIFFERENCE BACKUP
★DESTRUCTION OF RAID
F I G.  1 1 A
DESTINATION OF RESTORED DATA
| A |
|---|
| B |
| C |
| D |
| E |
| F |
|   |
| A | B | C | D | E | F |
|---|---|---|---|---|---|
RESTORING A THROUGH F
RESTORING ENTIRE BACKUP DATA (RESTORATION)
F I G.  1 1 B

FIG. 12A
FIG. 12B
FIG. 12C

| MODE | TIME STAMP | MEDIUM | NUMBER OF PIECES | MEDIUM ID | LABEL |
|---|---|---|---|---|---|
| ENTIRE | 2000.4.20.17.10.25 | MO | 2 | AAAA | Backup 420-1 |
| | | | | AAAB | Backup 420-2 |
| DIFFERENCE | 2000.4.21.17.15.10 | MO | 1 | AAAC | Backup 420 DIFFERENCE 1 |
| DIFFERENCE | 2000.4.22.17.30.15 | MO | 1 | AAAC | Backup 420 DIFFERENCE 1 |
| DIFFERENCE | 2000.4.23.17.22.56 | MO | 1 | AAAC | Backup 420 DIFFERENCE 1 |
| DIFFERENCE | 2000.4.24.17.00.10 | MO | 1 | AAAD | Backup 420 DIFFERENCE 2 |

FIG. 18

| | | | | | | | | | | |
|---|---|---|---|---|---|---|---|---|---|---|
| BIGIN(0) | | | | | | | | | | |
| OBTAINING A0 | BUSY | | | | | | | | | |
| OBTAINING B0 | BUSY | BUSY | | | | | | | | |
| OBTAINING C0 | | BUSY | BUSY | | | | | | | |
| COMMIT | | | | | | | | | | |
| UPDATING C0 | | | | | | | | | | |
| BACKUP | | | | | | | | | | |
| OBTAINING A1 | | | | BUSY | | | BUSY | BACKUP | FREE | |
| OBTAINING B1 | | | | | BUSY | | BUSY | BACKUP | FREE | |
| OBTAINING C1 | | | | | | ★FAILURE | | RETAINING | | |
| OBTAINING D1 | | | | | | | BUSY | BACKUP | FREE | |
| REFERENCE | | | | | BUSY | | | | | |
| OBTAINING C1 | | | | | | | BUSY | FREE | | |

FIG. 23

| | | | | | | | | |
|---|---|---|---|---|---|---|---|---|
| BEGIN(0) | | | | | | | | |
| OBTAINING A0 | BUSY | BUSY | BUSY | | | | | |
| OBTAINING B0 | | BUSY | BUSY | | | | | |
| OBTAINING C0 | | | BUSY | | | | | |
| COMMIT | | | | | | | | |
| OBTAINING D0 | | | | | | | | |
| BACKUP | | | | | | | | |
| OBTAINING A1 | | | | BUSY | BUSY | BUSY | RETAINING | FREE |
| OBTAINING B1 | | | | | BUSY | BUSY | RETAINING | FREE |
| OBTAINING C1 | | | | | | ★FAILURE | RETAINING | FREE |
| OBTAINING D1 | | | | | | BUSY | BACKUP | |
| REFERENCE | | | | | BUSY | BUSY | | FREE |
| OBTAINING C1 | | | | | | | | |

F I G. 2 5

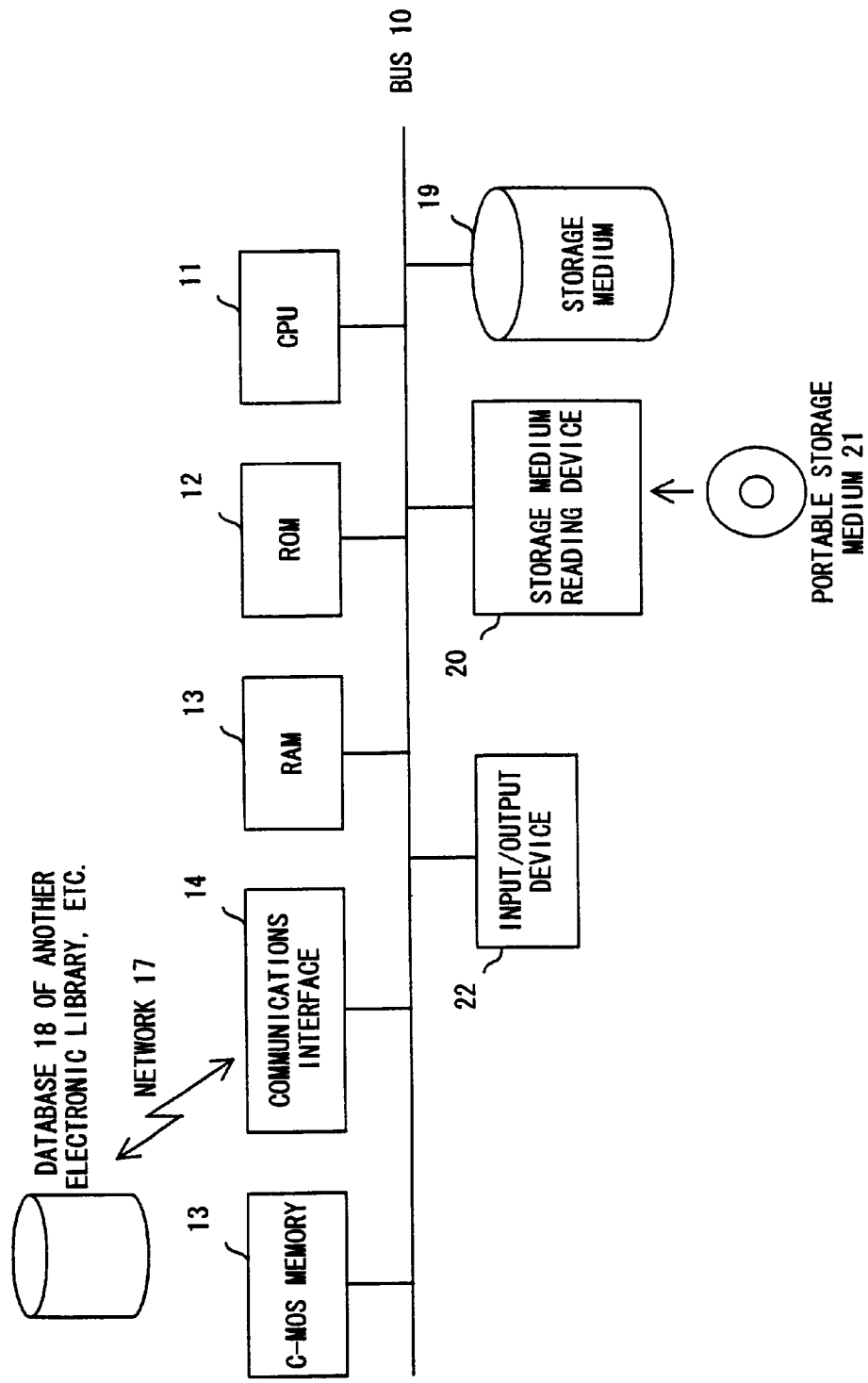
F I G. 2 6

APPARATUS, METHOD, AND STORAGE MEDIUM FOR FILE MANAGEMENT

BACKGROUND OF THE INVENTION

1. Field of the Invention

The present invention relates to an electronic library which is a file management apparatus, and more specifically to a system for sweeping and backing up a file registered in the electronic library for electronically guaranteeing the originality of a document.

2. Description of the Related Art

With the latest development of information processing devices, documents conventionally managed on paper have been managed as electronic data. However, since an information processing device can easily copy or falsify a document of electronic data, there is a strong possibility that an original document cannot be detected in a plurality of documents stored in the device. To solve the problem, an electronic library has been developed as an information processing device for managing an electronic original document.

An electronic library, that is, a device for discriminating an original document from a copy, realizes the originality by having the following functions.

(1) An original document can be discriminated from a copy. The original document can be unique when the original document is moved to another electronic library.

(2) When an original document is falsified, it can be detected.

(3) All operations performed on an original document are stored, and all falsification on the operations are detected. Operations refer to all operations such as registering, referencing, updating, moving, copying, generating a backup, sweeping data to another medium, restoring data, etc. In an updating operation, an entity of each generation is stored.

(4) An access right to an original document is controlled.

In these functions, since a file (electronic documents, etc.) is basically stored in a RAID (redundant array of independent disks) device, the entire volume of a stored file is large, and it is necessary to extend a disk or sweep a part of the file to an external medium before the RAID device becomes full.

When a backup file is generated, and a storage medium (a disk, etc.) containing data of an original file is destroyed, the data is restored from a backup medium and to the state that existed at the time of backup. Obviously, the information after the previous backup process cannot be restored. However, it is necessary to maintain the originality (or the uniqueness of an original document) when data is restored after a backup process when an electronic library for discriminating an original document from a copy is managed.

FIG. 1 shows the sequence of documents to be managed as a unit.

When a document 1 is first generated, it is stored in an electronic library as the first version of the document 1. The first version of the document 1 and the management information about it required by the electronic library to guarantee the originality of the document are managed as a set of information. When the second version of the document 1 is generated by updating the original document of the document 1, the second version of the document 1 and the management information about the second version of the document 1 are managed as a set of information. Similarly, the third version of the document 1 and the management information about the third version of the document 1 are managed as a set of information. Thus, when the document 1 is repeatedly updated sequentially into the first version through the n-th version, the first through the n-th versions of the same document 1 are referred to as one sequence. That is, when a document is changed by sequentially being updated, the history is referred to as a sequence. Therefore, if two documents are changed by being updated, etc., there exist two sequences of documents.

To guarantee the originality of a document, not only a file server, but also the above mentioned specific functions are required. In addition, when an original document is electronically stored, it is normally stored in a RAID device as with a common file server. When the RAID device is full, it is necessary to add a disk device, or sweep an older file into a tape or an MO. Therefore, the following care different from that of a normal file server is required in controlling the sweeping process.

(1) A file is not to be unconditionally swept. If it can be unconditionally swept, different versions of an original document in the same sequence are swept into different media, thereby complicating the management and maintenance.

(2) Swept information cannot be restored on other devices. If it is possible, there arise not only double original documents, but also serious security problems.

(3) It is necessary to detect the falsification performed on an external medium into which a file is swept. Unless the falsification of the external medium can be detected, there occurs the possibility that the source medium is intentionally damaged, and an illegal original document can be generated from a falsified backup medium (4) When a swept file is used again, it is necessary to clearly manage as to which medium the file has been swept into.

(5) There can be a case in which an external medium becomes full during the sweeping process, and there is no standby medium at hand.

(6) A sweep history file is to be copied in case of a failure of a RAID-disk. In the following case, a disk can be full in the process of restoring a file after the destruction of a RAID device.

(7) A file is not always swept into an external medium. Since the process of sweeping a file into an external medium is performed through an operator, it may be inconvenient to sweep a file online. A destination medium for a swept file can be another electronic library.

FIGS. 2A, 2B, 3A, 3B, and 3C show the cases in which a swept document cannot be restored on a storage medium in a sweeping process.

First, as shown in 2A, documents A through F stored on the first storage medium such as a disk are totally copied on the second storage medium. Then, as shown in FIG. 2B, when a new document G is added, there still remains a space on the first storage medium. Therefore, the document G can be stored.

Then, since the first storage medium has become full as shown in FIG. 3A, the documents A through C are to be swept. At this time, the documents A through C are moved to the third storage medium, and simultaneously the history that the documents A through C have been swept is generated. Next, as shown in FIG. 3B, documents H through J are added in an empty area obtained as a result of sweeping the documents A through C. When the document stored on the first storage medium is to copied, the difference from the previous backup contents is stored. That is, the documents G through J added after the previous backup are copied, and the history that the documents A through C have been swept is also copied.

Assume that the first storage medium, which is a RAID device, has been destroyed. Then, the documents A through J are to be restored on a new storage medium from the backup contents. However, since the new storage medium only has the capacity of the first storage medium which has been destroyed, the documents A through G can be restored, but the documents H through J cannot be restored on the new storage medium (see FIG. 3C).

Also when a file is copied with the originality guaranteed, not only a file server, but also the above mentioned specific functions are required. When the original document is electronically stored, it is normally stored on a RAID device as with a common file server. When a backup copy is made, it is stored on a tape device, an MO device, etc. The updated file obtained after the previous backup cannot be restored when the RAID device is destroyed. To avoid this, it is necessary to make a backup file for each transaction, which incurs considerable deterioration in system performance. However, to restore a file after backing it up, the following problems are to be solved in addition to the problems with a common file server.

(1) When a file is to be restored, it is necessary to completely restore the backup information. Partial restoration cannot guarantee the desired originality. For example, when an original document is updated with only a part of an updated history restored, an operation to be performed on the original document cannot be guaranteed.

(2) When a file is restored using another work medium prepared with a restoration procedure as a countermeasure against the problem described in (1) above, it is necessary to manage on the system side as to which work medium is to be used when there are a plurality of media.

(3) Copied information cannot be restored on another device. Otherwise, there are double original documents, and there occurs a serious security problem.

(4) It is necessary to detect the falsification on an external backup medium. Unless the falsification is detected, the source medium can be intentionally damaged, and an illegal original document can be generated from the falsified backup medium.

(5) After making a backup file, an original document is moved to another electronic library. If the RAID device is destroyed, and the document is restored, then there exist double original documents in the source device and the destination device.

(6) It is necessary to flexibly set a backup art timing, and reduce the deterioration of performance in a backup procedure.

(7) In a transaction relating to a plurality of original documents, it is necessary to successfully control such that backup copies can be made for all documents, or no backup copies can be made. This process is required to avoid a plurality of inconsistent files after the restoration of files.

SUMMARY OF THE INVENTION

The present invention aims at providing an apparatus and a method for appropriately sweeping a file such as a document, etc. or making a backup file using a file management apparatus such as an electronic library for guaranteeing the originality.

The file management apparatus according to the present invention includes a storage unit for storing an electronic file, a process unit for processing the electronic file, a history generation unit for generating a history file storing the history of the process, and a storage unit for storing the history file.

The method for managing a file according to the present invention includes: (a) a step of storing an electronic file; (b) a step of processing the file; (c) a step of generating a history file storing the history of the process; and (d) a step of storing the history file.

According to the present invention, when an electronic file is processed, for example, when an electronic file is swept and a backup electronic file is made, these histories are stored, and it can be clearly determined which electronic file is an original document. Therefore, only one original document is stored, and can be discriminated from a file stored in a storage unit or a storage medium different from that storing the original document, thereby successfully managing the electronic file without damaging the originality of the original document.

BRIEF DESCRIPTION OF THE DRAWINGS

FIG. 4 shows an example of the configuration of a sweep history file used in an embodiment of the present invention;

FIGS. 5A and 5B show the method (1) of avoiding the shortage of the capacity of a disk by detecting the capacity of the disk when a swept file is restored;

FIGS. 7A and 7B show the method (3) of avoiding the shortage of the capacity of a disk by detecting the capacity of the disk when a swept file is restored;

FIGS. 8A and 8B show the method (4) of avoiding the shortage of the capacity of a disk by detecting the capacity of the disk when a swept file is restored;

FIGS. 11A and 11B show the restoring process (3) when a file having a sweep history is detected when the restoring process is performed;

FIGS. 12A 12C show the restoring process (4) when a file having a sweep history is detected when the restoring process is performed;

FIG. 18 shows an example of a configuration of a backup history file;

FIG. 23 shows a transaction process and a backup file (1);

FIG. 25 shows a transaction process and a backup file (2); and

FIG. 26 shows the configuration of the hardware of an electronic library required when the process according to an embodiment of the present invention is realized by a program (software).

DESCRIPTION OF THE PREFERRED EMBODIMENTS

Figure 1:
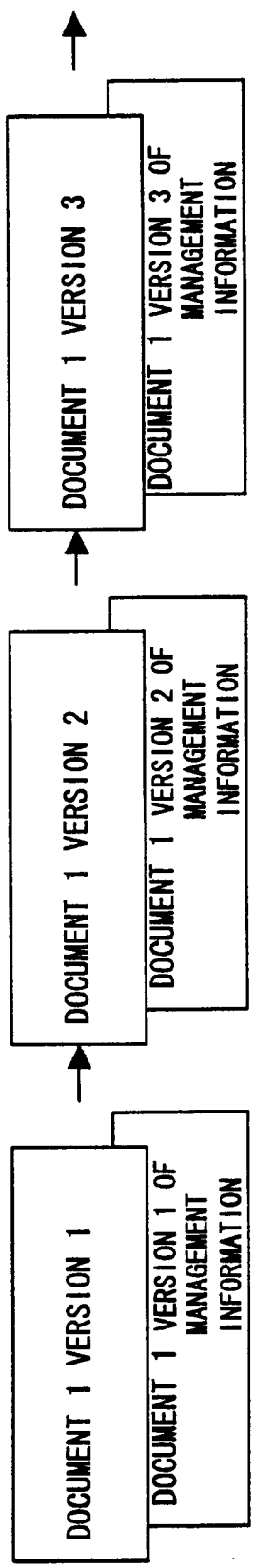
FIG. 1 shows a sequence of documents managed as a unit in the document management by an electronic library.
Figure 2A:
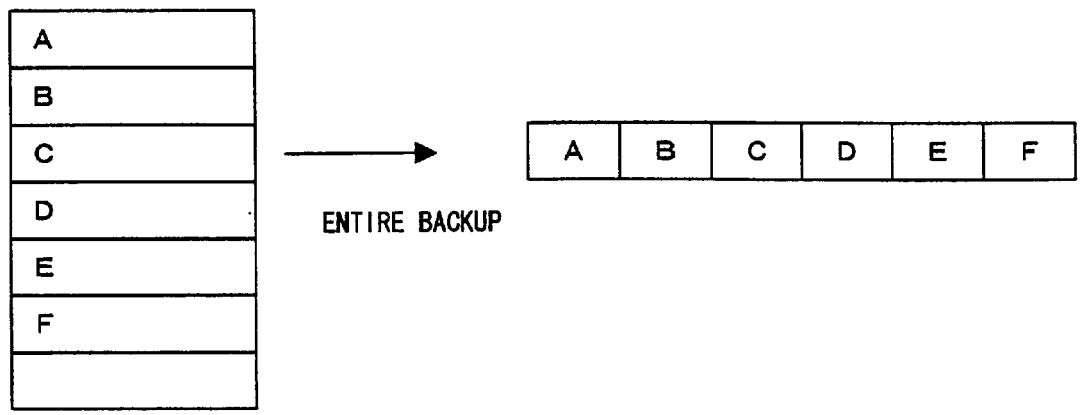
FIGS. 2A and 2B show that a swept document cannot be restored on a storage medium in a sweeping process (No. 1)
Figure 2B:
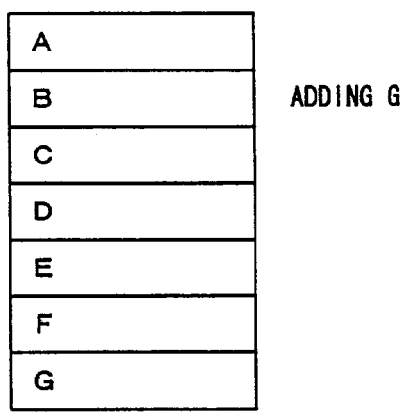
Figure 3A:
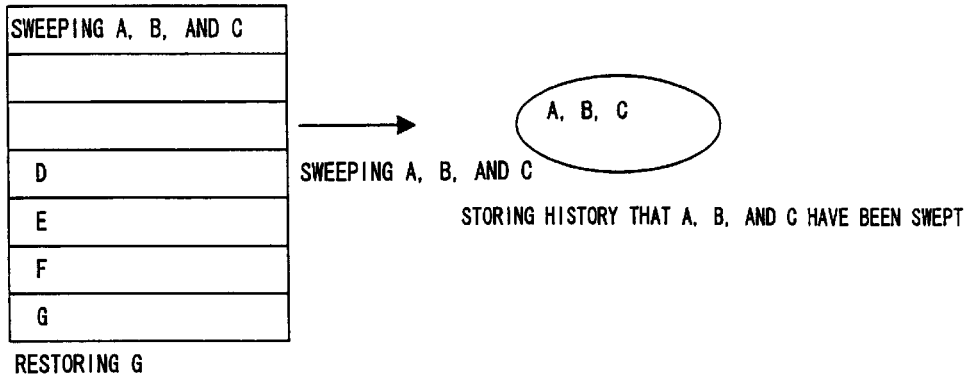
FIGS. 3A through 3C show that a swept document cannot be restored on a storage medium in a sweeping process (No. 2)
Figure 3B:
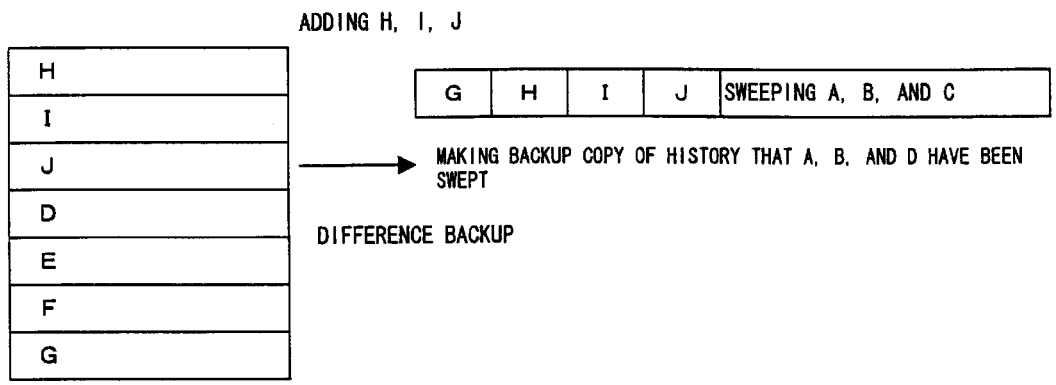
Figure 3C:
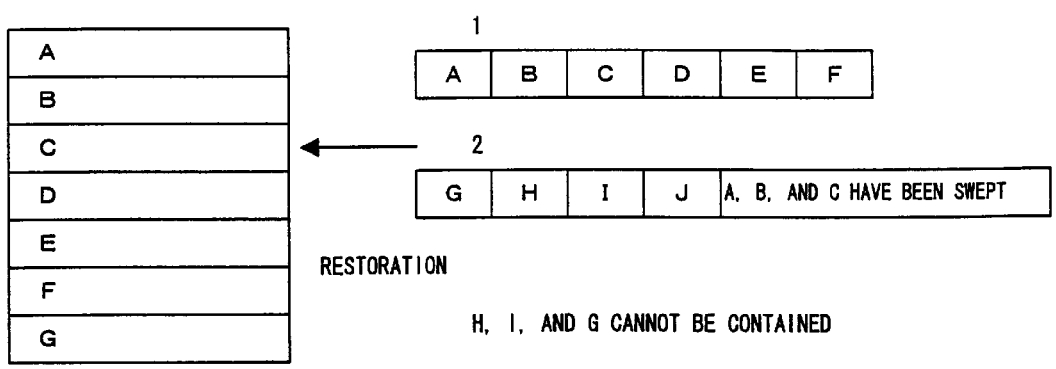

First, a sweeping process is described below.

When a document file is swept, it is efficient in management and operation to collectively sweep a sequence of files, for example, original documents which were registered months ago and are assumed not to be updated in the future. Only the latest version of a document to be periodically updated can be stored on a disk for quick access. The embodiment of the present invention has a mode in which a sequence of files are collectively swept, and a mode in which only old files are swept. To realize these modes, the user-specified update date of a sequence of files is confirmed, and the files other than the latest version are swept, or the sequence of files are all swept when the sequence is specified by the user, whichever can be easily realized by one of ordinary skill in the art.

Since each electronic library has an electronic library ID, a source electronic library ID is written to a destination medium (a storage medium as a destination of a swept file) to prevent the file from being restored in other electronic libraries.

Furthermore, each electronic library has a unique encryption key. When a file is swept, it is encrypted using the encryption key.

When a swept file is used again in a sweeping process, it is necessary to clearly manage the file as to which medium the file has been swept to. To attain this, a destination medium is assigned an ID and a history file contains the correspondence between the swept file and the destination medium. When the file is restored, it is restored without fail from a correct medium according to the contents of the history file.

When an external medium (a destination medium of a swept file) becomes full during the sweeping operation, and there is no standby medium at hand, there can be the possibility that the sweeping operation is canceled. In this case, the data on the disk is stored as is, and the data on the external medium generated halfway (unmanaged data) is not registered in the sweep history file. Thus, the electronic library is restored to the state before the sweeping operation, but the data on the medium halfway (unmanaged data) is kept as recognizable as unmanaged data.

When an entire backup file is made, a sweeping operation is performed, or a difference backup file is made, files may not be completely stored on the destination disk as described above when they are restored. To avoid this, the total volume of files is counted for the entire backup file, the difference backup file, and the files generated after the processes. If the value exceeds a predetermined capacity (for example, 70% of the capacity of the disk), then the user is prompted to perform again the entire backup process.

In the method of making a backup copy by making a difference backup copy after making a total backup copy, each backup file is restored by deleting the entity of a swept file when backup files are made in an original document sequence unit in the order recorded in the operation history, and a file having a sweep history at the time of restoration is detected.

When a file is restored from a backup medium, the sweep history in the same medium is first restored. When a sweeping process is described in the file, the entity of the file restored in the restoration procedure is first deleted.

A destination medium is not limited to an external medium, but can be another device having the same function.

FIG. 4 shows an example of the configuration of a sweep history file used in an embodiment of the present invention.

The sweep history file as shown in FIG. 4 is stored on a medium such as a disk not storing a swept file. The sweep history file shown in FIG. 4 comprises fields of intra-electronic-library document information, a time stamp, a storage medium, and a medium ID.

The intra-electronic-library document information is, for example, a document name. In FIG. 4, documents A, B, C, D, and E are stored. A time stamp records the date and time on which each document is processed in a sweeping operation. The time stamp refers to a time recorded by a clock provided in a electronic library. The clock is set such that the time cannot be changed after the delivery from the factory. A storage medium stores information for identification of a destination storage medium. In this case, 'MO' is described. That is, in the case shown in FIG. 4, the type of the destination storage medium of the swept documents A through E is an MO. A medium ID is an identifier uniquely identifying the storage medium (MO in this case) storing the documents A through E. The medium ID specifies which medium stores each of the documents A through E.

Therefore, when a temporarily swept document file is restored, a electronic library instructs a user who refers to a sweep history file, and tries to restore the document file to set the MO specified by the medium ID 'ABCD' in a storage medium reading device when the document A is to be restored. Thus, the original documents A through E can be collectively managed.

Furthermore, when falsification detection information is added to the original data, the data is encrypted using a key unique to the electronic library, and is then swept and restored based on the sweep history file. At this time, since the data is restored using a key unique to the electronic library, the swept data can be prevented from being falsified, and it can be completely restored in the original electronic library.

FIGS. 5A through 8B show the method of avoiding the shortage of the capacity of a disk by detecting the capacity of the disk when a swept file is restored.

As shown in FIG. 5A, when the documents A through C are stored on the first storage medium, the documents A, B, and C are entirely copied on a backup medium at a certain time point. Then, the document D is added as shown in FIG. 5B.

Figure 6A:
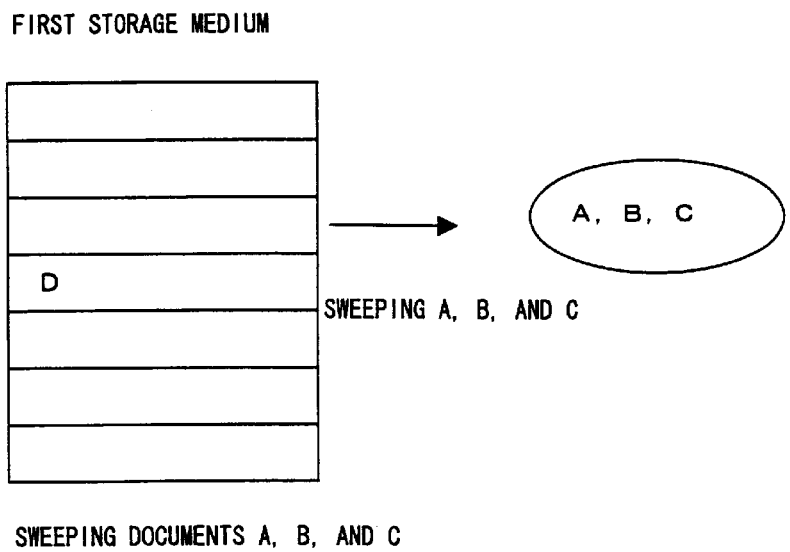
FIGS. 6A and 6B show the method (2) of avoiding the shortage of the capacity of a disk by detecting the capacity of the disk when a swept file is restored.
Figure 6B:
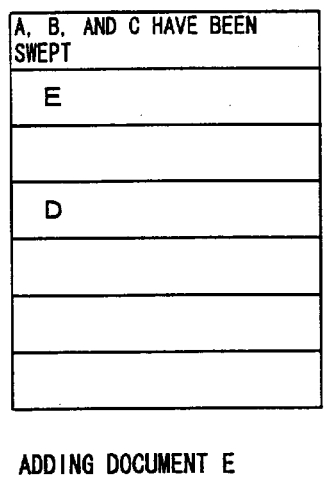

Then, as shown in FIG. 6A, the documents A through C are swept. Only the document D is left in the first storage medium, and there is a larger writable area on the first storage medium. When the document E is added as shown in FIG. 6B, the first storage medium also stores the information about the previously swept documents A through C, that is, the information that the documents A through C have been swept. At this time, another storage medium also stores a sweep history file. Then, as shown in FIG. 7A, if there is a backup request when the document E is stored, a difference backup copy is made. That is, backup copies are made for the documents D and E, and the information that the documents A through C have already been swept is also copied for backup.

When the document F is added as shown in FIG. 7B, it is detected that the total volume of the documents has exceeded 70% of the disk capacity of the first storage medium, thereby issuing an entire backup request. Then, as shown in FIG. 8A, the contents of the first storage medium are totally copied for backup. That is, the information that the documents A through C have been swept and the documents D through F are copied for backup. If the first storage medium which is a RAID is destroyed when the above mentioned backup and sweeping processes are being performed, then data is restored based on the result of the previous entire backup process. That is, the information that the documents A, B, and C have been swept and the documents D through F are restored. Thus, the information entirely copied for backup does not contain the documents A through C, thereby avoiding the problem that the destination medium is running short of the storage capacity (refer to FIG. 8B).

FIGS. 9A through 12B show the restoring process when a file having a sweep history at the time of restoration is detected.

Figure 9A:
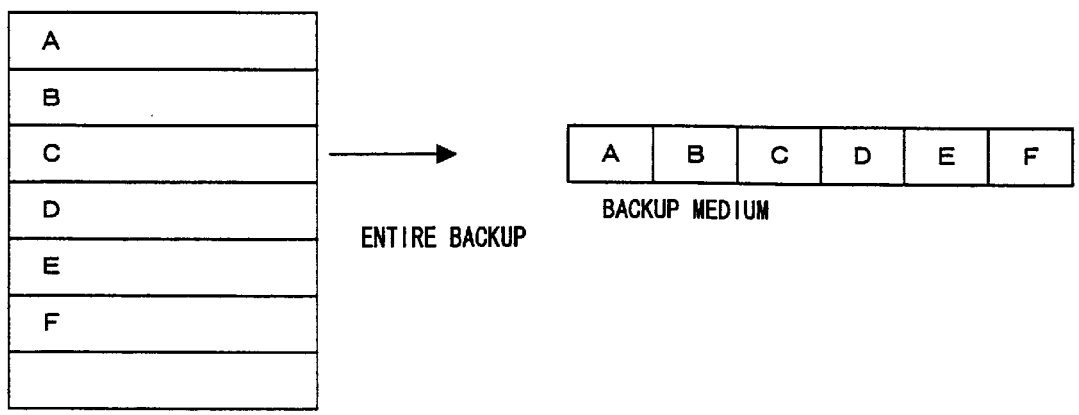
FIGS. 9A and 9B show the restoring process (1) when a file having a sweep history is detected when the restoring process is performed.
Figure 9B:
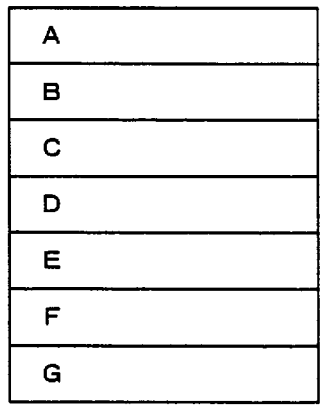
Figure 10A:
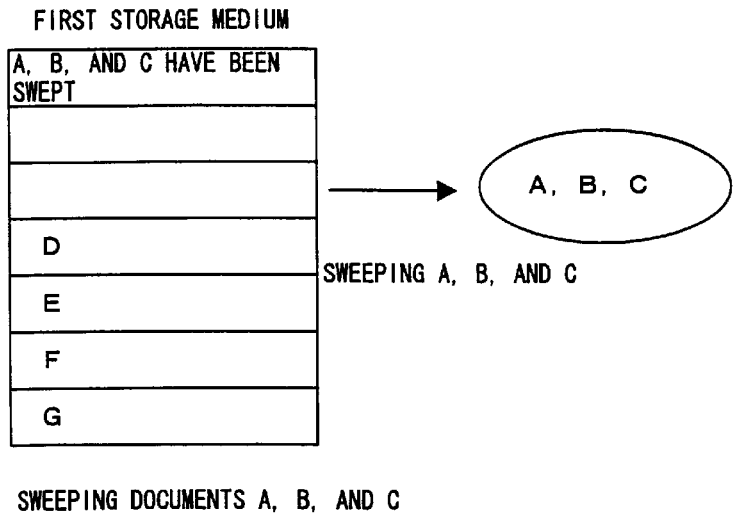
FIGS. 10A and 10B show the restoring process (2) when a file having a sweep history is detected when the restoring process is performed.
Figure 10B:
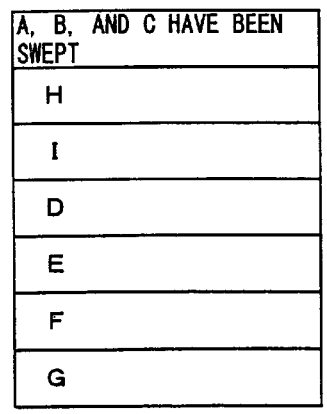

First, as shown in FIG. 9A, the documents A through F stored on the first storage medium which is a main storage device are totally copied for backup. Thus, a backup medium stores the documents A through F. Then, assume that, as shown in FIG. 9B, the document G is added to the first storage medium. In FIG. 10A, the documents A, B, and C are swept into another storage medium, and the information that the documents A, B, and C have been swept is stored on the first storage medium. At this time, the sweep history file is stored on another medium. Then, as shown in FIG. 10B, it is assumed that the documents H and I are added. In FIG. 10A, a backup copy is made. The backup process refers to a difference backup process. That is, the documents G, H, and I and the information that the documents A, B, and C have been swept are copied for backup.

At this time, when the first storage medium which is a RAID is destroyed, the restoring process is performed as shown in FIG. 11B. Thus, the documents A through F which are first copied totally for backup are restored.

Then, the second backup copy (difference backup copy) is restored. First, in FIG. 12A, the document G is restored. Then, since the contents of the backup file include the information that the documents A, B, and C have been swept as shown in FIG. 12B, the documents A, B, and C are set in a sweep state. At this time, the actual process of sweeping the documents A through C is not performed because the original documents of the documents A through C have already been swept as shown in FIG. 10A. Therefore, in FIG. 12B, the documents A through C are deleted, and the information that the documents A through C have been swept is restored. Thus, as shown in FIG. 12C, the documents H and I are restored, thereby terminating the restoring process.

FIGS. 13 through 15C show another embodiment of the restoring process shown in FIGS. 9A through 12B.

According to the present embodiment, the process shown in FIGS. 12A and 12B is performed as follows.

Figure 13:
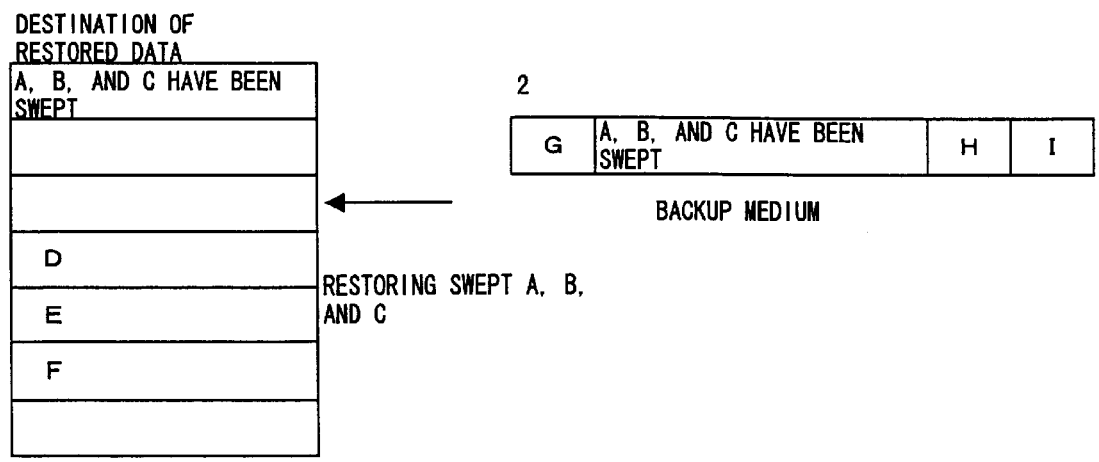
FIG. 13 shows another embodiment (1) of the restoring process shown in FIGS. 9A through 12C.
Figure 14A:
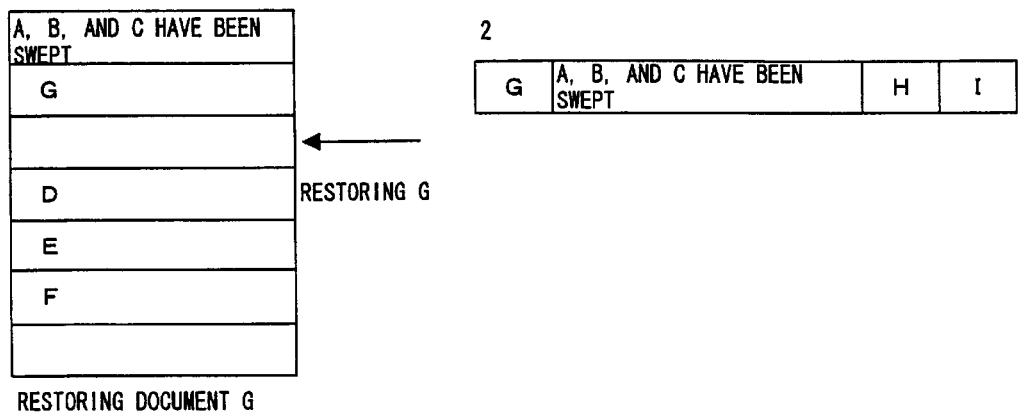
FIGS. 14A and 14B show another embodiment (2) of the restoring process shown in FIGS. 9A through 12C.
Figure 14B:
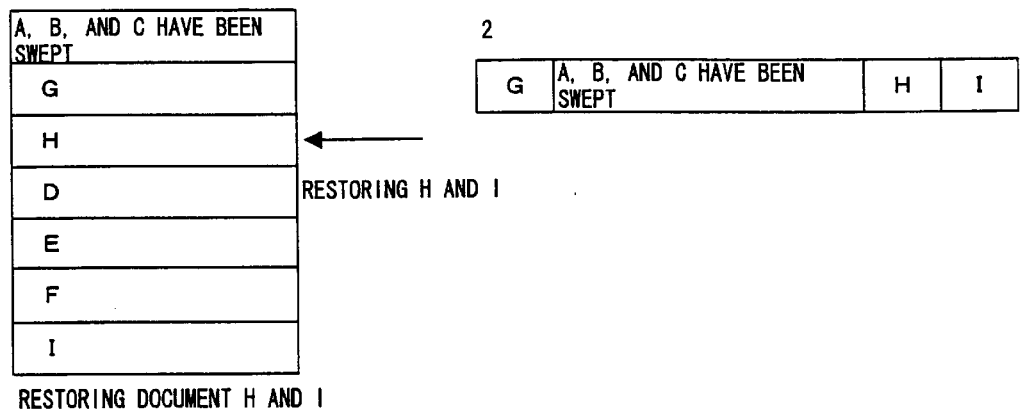

That is, as shown in FIG. 13, the information that the documents A, B, and C have been swept is restored from the second backup information stored on the backup medium. Then, as shown in FIG. 14A, the document G for which a backup copy has been made is restored. Then, the documents H and I are restored as shown in FIG. 14B.

Figure 15A:
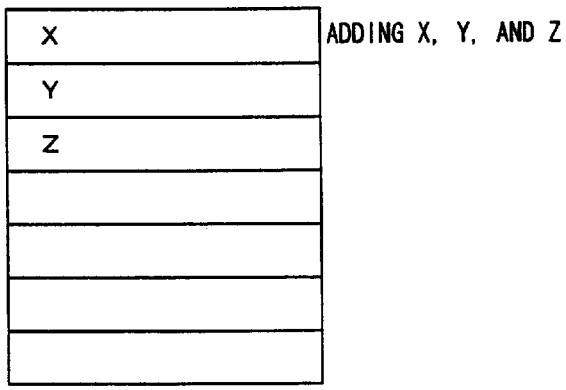
FIGS. 15A through 15C show another embodiment (3) of the restoring process shown in FIGS. 9A through 12C.
Figure 15B:
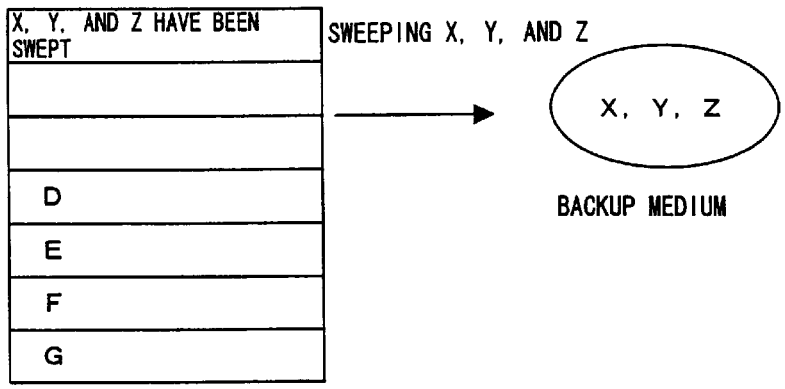
Figure 15C:
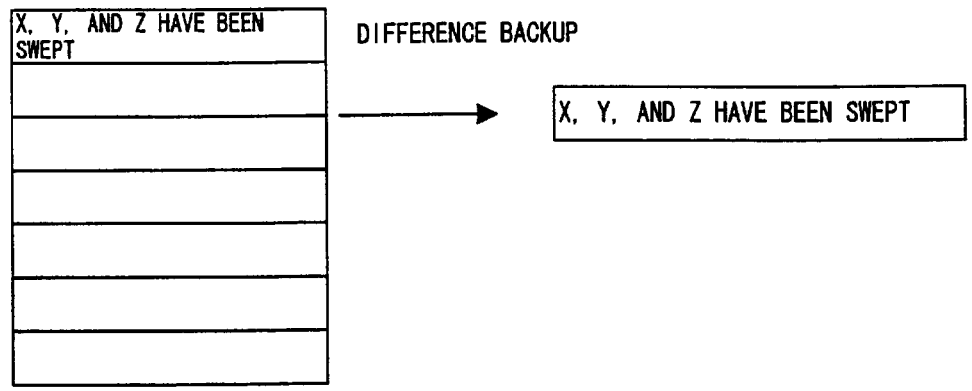

Between the previous backup process and the next backup process, the documents X, Y, and Z are added. When the documents X, Y, and Z are swept, only the sweep history of the documents X, Y, and Z is copied for backup at the time of the next difference backup process. That is, as shown in FIG. 15A, the documents X, Y, and Z are stored on the first storage medium. When the documents X, Y, and Z are swept as shown in FIG. 15B, the document data of the documents X, Y, and Z is stored on a backup medium, and the first storage medium stores the information that the documents X, Y, and Z have been swept. Then, as shown in FIG. 15C, when a backup copy is made, it is a difference backup copy, thereby obtaining a backup copy of the information that the documents X, Y, and Z have been swept.

Figure 16:
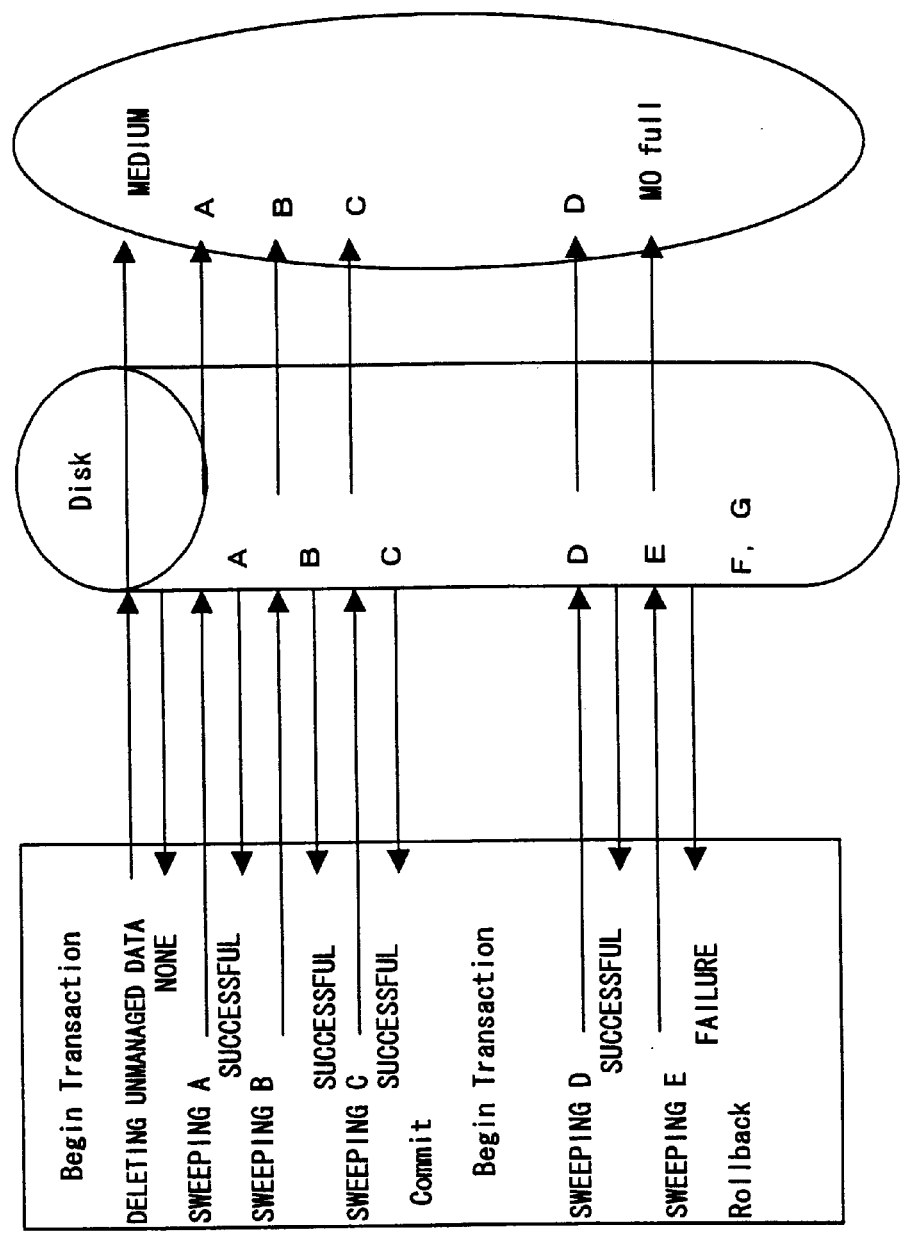
FIG. 16 shows a practical example (1) of a sweeping process.
Figure 17:
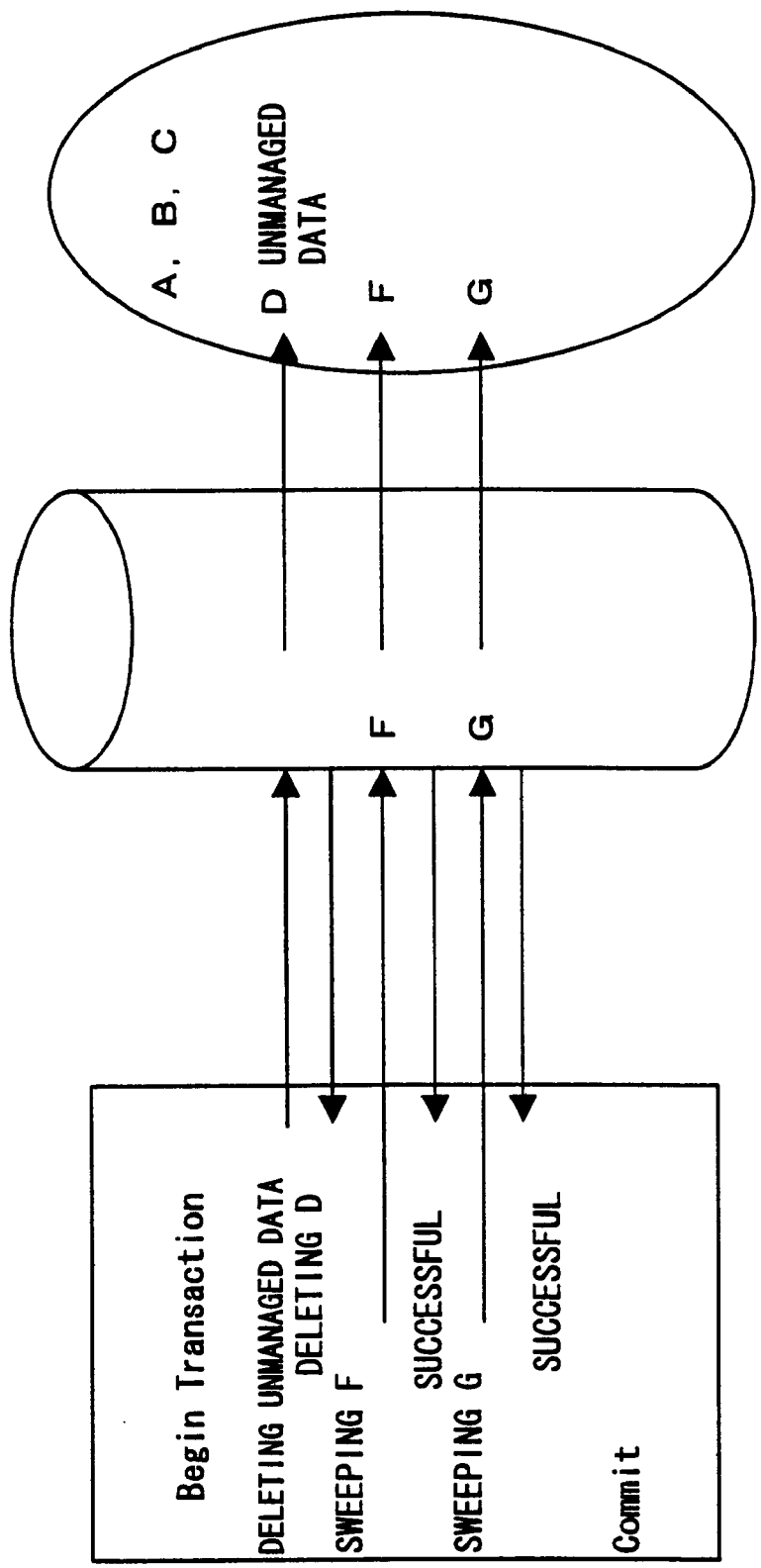
FIG. 17 shows a practical example (2) of a sweeping process.

FIGS. 16 and 17 show a practical example of a sweeping process.

A practical example of a sweeping process can be, for example, a case in which files A, B, and C relate to a certain operation, files D, E, F, and G relate to another operation, the disk is running short of empty space, and a set of files are to be collectively swept.

First, the process is started with 'Begin Transaction', and unmanaged data is first deleted. Then, the documents A through C are swept from the disk to a medium. When the documents A through C have been completely swept, a series of sweeping processes terminate with 'Commit'. Then, the documents D and E are to be swept. In this case, the process starts with 'Begin Transaction'. The document D is first swept, and then the document E is swept. However, since the medium has become full, the document E cannot be swept. Since the process which has started with 'Begin Transaction' has not successfully terminated, the process terminates with 'Rollback'. As a result, since the sweeping process has been suspended, its sweep history is not added to the sweep history file. Therefore, the data of the document D written to the medium is unmanaged data. As a result, the sweep history file stores only the documents A, B, and C. On the other hand, the documents A, B, C, and D are stored on the medium. When the documents F and G are to be swept, the document D which is unmanaged data is first deleted from the medium in the sweeping process starting with 'Begin Transaction'. Then, the documents F and G are swept from the disk to the medium. If they can be successfully swept, the process terminates with 'Commit'. Thus, the document D on the medium is recognized as unmanaged data and deleted. If the volume of the documents F and G can be contained in the medium, the transaction successfully terminates.

Described below is a backup process.

According to an embodiment of the present invention, a history describing which file is stored on which medium is stored on another medium when a file is copied for backup.

Conventionally, the restoration process is left to the operation of a system administrator, and essential system operations can be performed if only necessary files can be restored although a part of files are omitted or ignored in the restoring process. According to an embodiment of the present invention, a complete restoring operation can be realized based on the contents of the above mentioned backup history file.

When there are a plurality of media storing a backup file, a restoring process can be correctly performed by the system grasping which medium is to be used in the process according to the backup history file.

Each electronic library has its own electronic library ID. The electronic library ID is written to a backup history file to prevent the file from being restored in other electronic libraries.

Otherwise, each electronic library has a unique encryption key. When a backup copy is made, a file is encrypted and stored using the encryption key.

When a transaction occurs to move an original document after making a backup copy at a certain time point, the transaction is recorded on a unit (such as C-MOS memory, etc.) other than a normal storage device (RAID device). When the document is restored, a destination electronic library is referred to based on the transaction so that double original documents can be avoided.

Since the information can be deleted when the next backup copy is made, the capacity of the C-MOS memory can be minimized.

A backup operation can be performed in an entire backup mode and a mode in which a difference detected after an entire backup process can be copied for backup. Since the difference backup process can be performed during the online operation of the file management apparatus, files to be copied for difference backup can be extracted, and unused files can be excluded in order. Among the files, a file a part of which is unused is awaited until its use has been completed and then released, and the first mode is set to make copies of all files for backup after completion of exclusive process. However, in this mode, before obtaining all target files, other files are excluded by the backup transaction. Therefore, the subsequent requests are kept waiting. As a result, the second mode is set by making backup copies after excluding only unused files in the target files, and holding the files until the next backup timing of the target files being used.

FIG. 18 shows an example of the configuration of the backup history file.

The backup history file is provided with fields of a mode, a time stamp, a medium, the number of pieces, a medium ID, and a label. The mode refers to either the entire backup mode or the difference backup mode. In FIG. 18, only the first backup process makes entire backup files. The time stamp stores the time at which a backup copy is made using a clock provided for the above mentioned electronic library. The medium refers to the type of destination medium. In FIG. 18, all media is 'MO'. The number of pieces indicates the number of media being used for backup. In FIG. 18, when the first entire backup copy is made, two MOs are used. In other difference backup processes, an MO is used for each process. The medium ID refers to the ID of a medium storing a backup file. In the second through fourth difference backup processes, the same medium is used. The label refers to an identifier for uniquely determining a backup process, and a label is applied to each backup process. In FIG. 18, in the second through fourth difference backup processes, an identifier is assigned to the processes as if they were the same transaction.

In some transactions a files A0, B0, and C0 are registered and updated as associated with each other. When these files are updated, files A1, B1, and C1 are obtained, and then they are copied for backup, there is the possibility that a transaction other than a backup process is using the file C1 for a search through it. At this time, in the above mentioned second mode, only the files A1 and B1 are copied for backup. Afterwards, when the RAID device is destroyed, and a restoring process is performed, the files A1, B1, and C0 are obtained without consistency among them after the restoring process. To avoid this problem, the following process flow is adopted.

When a plurality of files are associated with each other for access, the following procedure is used.

(1) BEGIN TRANSACTION
(2) obtaining the file A (exclusive), then updating
(3) obtaining the file B (exclusive), then updating
(4) obtaining the file C (exclusive), then updating
(5) COMMIT (The files A, B, and C are released.)

The electronic library monitors the process of the transaction, recognizes that the files A, B, and C are associated with each other, a backup process is performed only when all the files A, B, and C are obtained in the second mode in the backup process. When any of them cannot be obtained, the backup process is performed at the subsequent backup timing.

A backup file can be restored only in the initial system state (immediately after the installation).

Although the latest backup data is restored, the data after the backup process cannot be restored. Therefore, if the registered document is illegal data, then the data can be discarded by restoring the backup data.

To avoid the above mentioned problem, the restoring process is permitted only immediately after the system is installed. The restoring process is performed when a disk is destroyed. In this case, the system is installed. As a result, the restoring process is permitted only in the system installed state.

When a restoring process is performed, the administrator is notified of the procedure based on the data stored on the above mentioned work medium (a medium used by a user for performing an operation), and the files are restored in the procedure.

Figure 19:
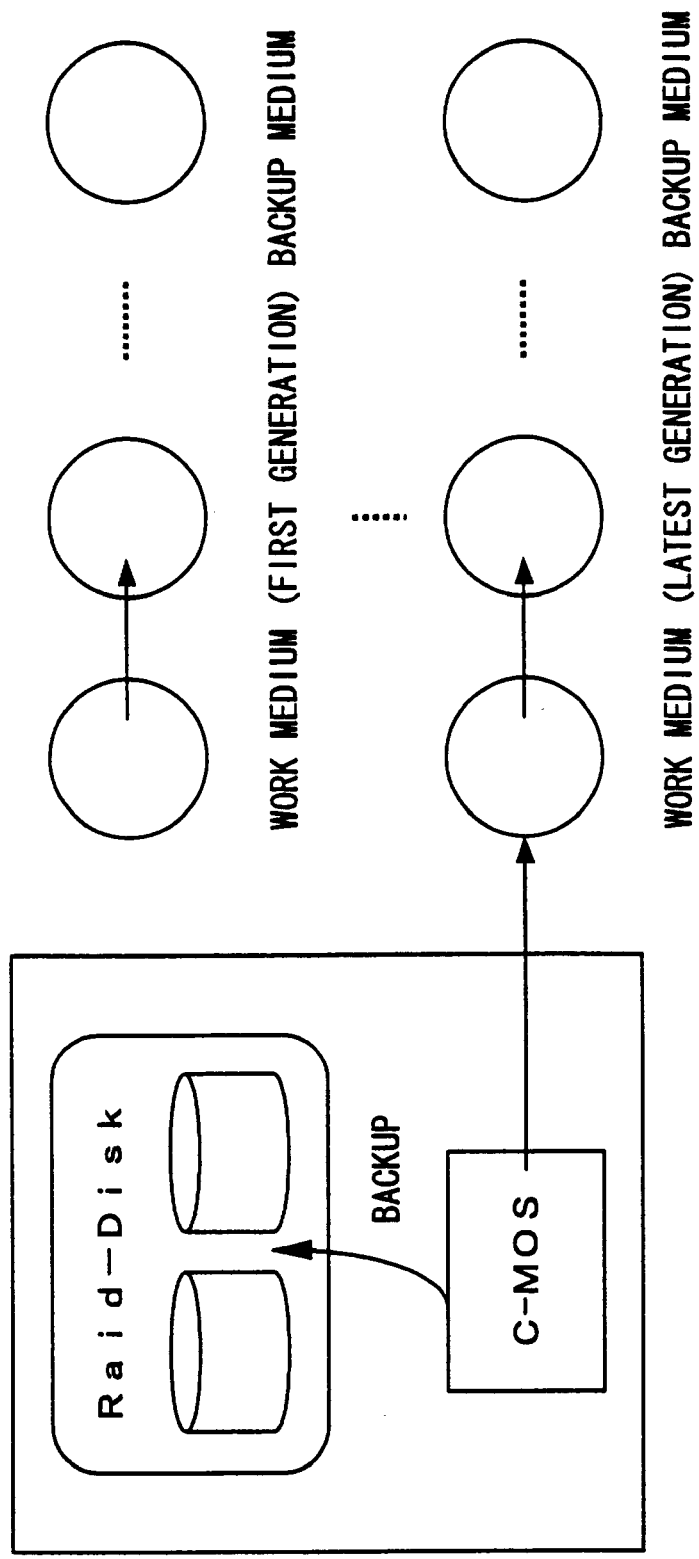
FIG. 19 shows the generation of a backup file.

FIG. 19 shows the generations of backup files.

The generation of a file refers to the number of times of the backup operations on the original document, and refers to the N-th file (N indicates the number of times of the backup operations). When there are a plurality of backup generations, the restoring operation can be correctly performed by storing the information as to which work medium is to be used on a unit (C-MOS memory, RAM, etc.) other than the RAID-disk. In addition, the contents of the C-MOS memory are copied for back up on the disk. When the C-MOS memory is destroyed, the data is restored from the disk to the C-MOS memory. When the RAID-disk is destroyed, the data is restored from the disk to the C-MOS memory. When the RAID-disk is destroyed, the system is first restored, and the restoring procedure is followed in the order of the C-MOS memory information, the latest work medium, and the backup medium.

Figure 20:
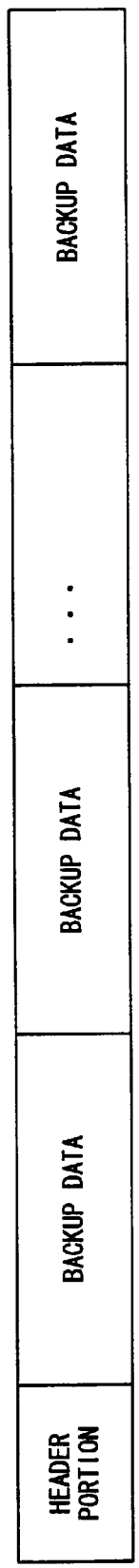
FIG. 20 shows the configuration of backup data.

FIG. 20 shows the configuration of backup data.

The backup data is prevented from being falsified, and the correct restoration to the original electronic library is guaranteed. To attain these, the data configuration as shown in FIG. 20 is adopted.

The header portion stores the following information (1) an electronic library ID (encrypted using an encryption key unique to each electronic library)
(2) a time stamp (as described above)
(3) a medium ID (an ID corresponding to a work medium is encrypted using an encryption key unique to an electronic library)

To avoid the falsification and monitoring when a backup process is performed, backup data is encrypted using a key unique to an electronic library. Furthermore, a falsification detection code such as a message authentication code (MAC) is also assigned. Thus, when encrypted data is unintentionally falsified, it can be detected.

The area in which an encrypting process is performed in an electronic library and an electronic library ID is stored is covered with an alarm grid. When the information is stolen, the alarm grid is disconnected, which is the trigger to erase the information, thereby guaranteeing the security.

Figure 21:
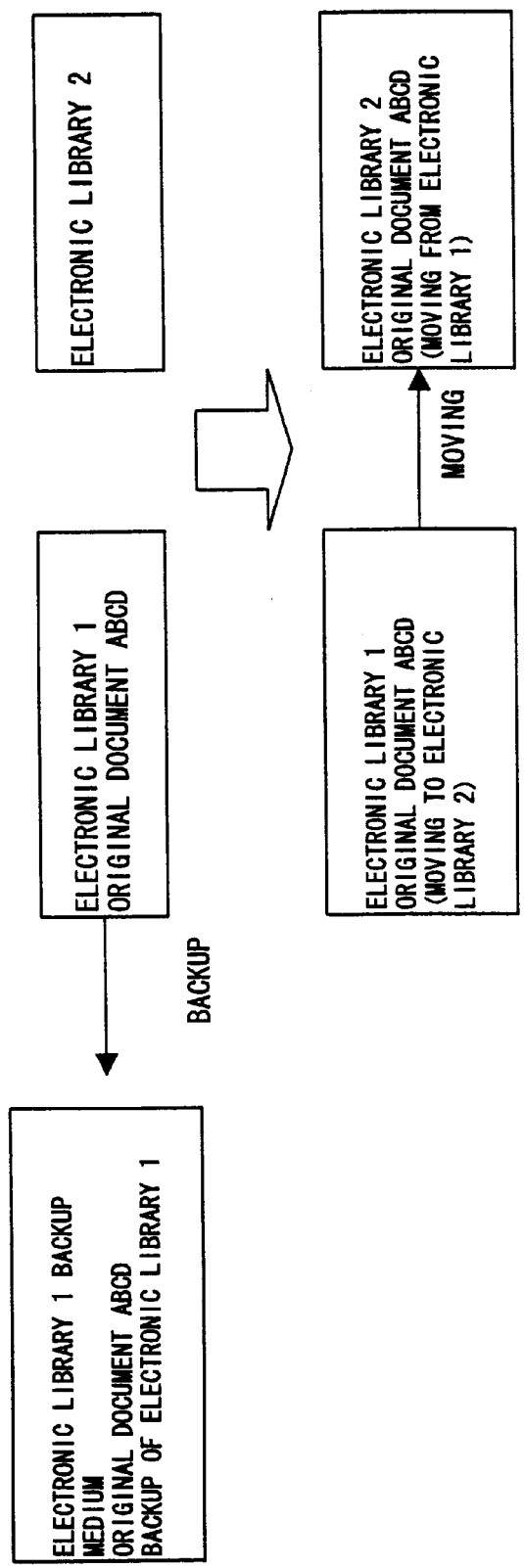
FIG. 21 shows the process performed when an original document is moved.

FIG. 21 shows the process performed when an original document is moved.

Figure 22:
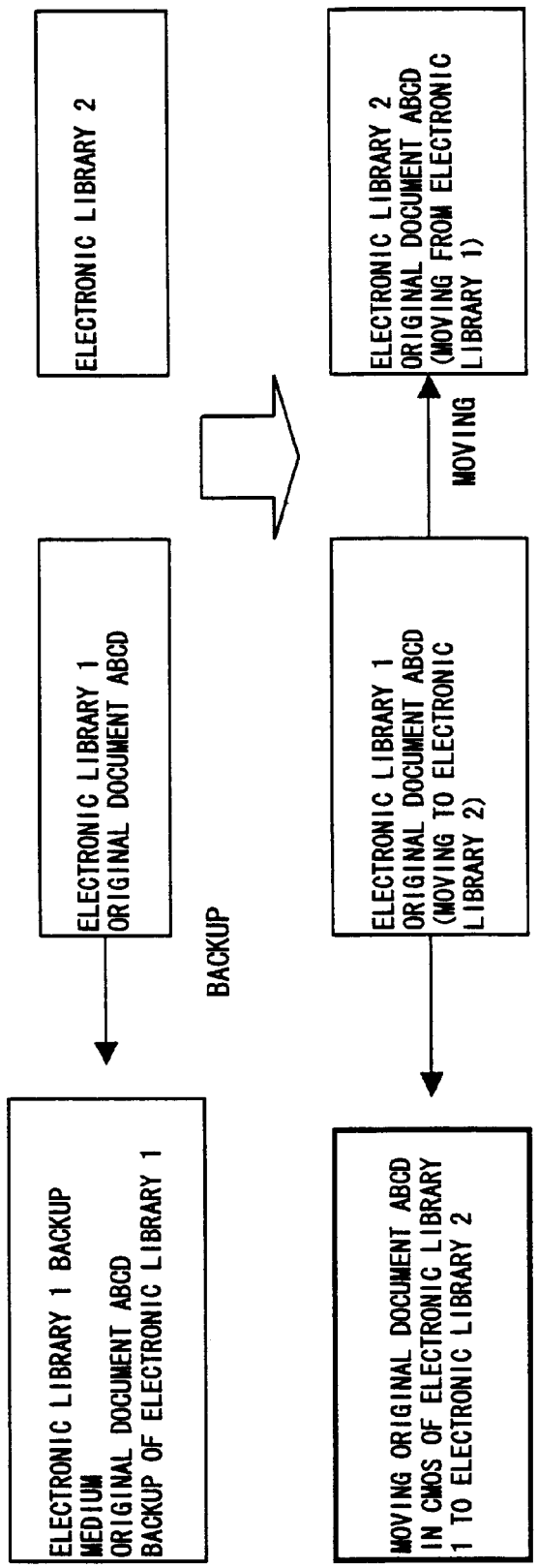
FIG. 22 shows the process performed when a backup copy of an original document is made by moving the original document.

FIG. 22 shows the process performed when the original document is copied for backup when it is moved.

As shown in FIG. 21, some transactions include original document to be moved. Moving an original document refers to moving an original document in an electronic library to another electronic library, and recording the information in the original electronic library that the original document has been moved to another electronic library.

As shown in FIG. 22, when an original document is copied for backup, the original document is moved, and the RAID in the electronic library 1 is destroyed, there are double original documents in the restored electronic library 1 and the electronic library 2.

Other operations (registration, update, etc.) after the destruction of the RAID after performing the backup process are obviously lost, but there are no double original documents.

When a difference backup process is performed, a target file is a file to which a change has been made after the previous backup process. When the device guarantees the originality, it is necessary to guarantee the operation performed on the original document. Therefore, all operations such as a referencing operation, a moving operation, etc. as well as an updating operation are included in the difference backup process.

For example, assume that there are 10 files, that is, A0, B0, C0, D0, E0, F0, G0, H0, I0, and J0. If operations are performed on all files, for example, the A0 is updated into A1, the B0 is referenced into B1, etc. after copying all the files for backup in the previous backup process, then it is necessary to copy all of the files A1 through J1 for backup in the next backup process. When a backup process is normally performed, the entire process is exclusively controlled. However, when the files A1, B1, and C1 are furthermore being used (exclusive use) in another transaction when a backup transaction occurs, the files D1 through J1 are exclusively obtained by a backup transaction, and then the release of the files A1, B1, and C1 is awaited (at this time, they have been updated into the files A2, B2, and C2). Then, after obtaining all target files, the backup operation is started. Although any of the files D1 through J1 is to be used by another transaction, they cannot be used because they have been obtained by the backup process. This method is reliable, but cannot be free from the reduction in performance.

Therefore, in the above mentioned method, a mode is set such that only the obtained files D1 through J1 are copied for backup, and the backup for the files A2, B2, and C2 are abandoned this time. In this method, when the files D1 through J1 are requested in another transaction, they are awaited only until the current backup process has been completed.

FIG. 23 shows a transaction process and a backup process (1).

In an electronic library, a transaction can be defined only when a series of related operations are performed on a plurality of original documents. For example, the original documents of the cover of a report, an attached file 1 (text), an attached file 2 (image) are respectively managed in an electronic library. When the original documents are revised, it is also possible to update a set of two attached files. In this case, the following procedure is followed on the original documents. Assuming that the above mentioned three files are A0, B0, and C0, they can be updated as a set in the following steps.

(1) BEGIN TRANSACTION ('1')
(2) obtaining the file A0 (exclusive), then updating
(3) obtaining the file B0 (exclusive), then updating
(4) obtaining the file C0 (exclusive), then updating
(5) COMMIT (The files A, B, and C are released.)

First, in (1) above, it is declared that the subsequent transactions are processed as a set of transactions. The processes on the documents are managed using a transaction ID ('1' in this example) not shown in the attached drawings. Afterwards, the file A0 is exclusively obtained, and then the files B0 and C0 are exclusively obtained. Once files have been exclusively obtained, they are not released until COMMIT is issued in (5) above. After the completion of the COMMIT, the files are updated into A1, B1, or C1.

Assume that, after a series of transactions have been completed, a backup process is performed, a backup transaction obtains the files A1 and B1, and another transaction has obtained the file C1 for reference (view) before the backup obtains the file C1 (the reference updates the file into C2). Then, only the files A1 and B1 are copied for backup.

To solve the above mentioned problem, a set of files operated for each transaction are registered in an area (such as C-MOS memory, etc. with battery backup) different from that of the RAID, and a backup process is performed only when the entire set can be obtained. After the backup process, the information about the C-MOS memory is cleared. When no backup process is performed, the information in the C-MOS memory is held as is, and the information is used in the next backup process.

Figure 24:
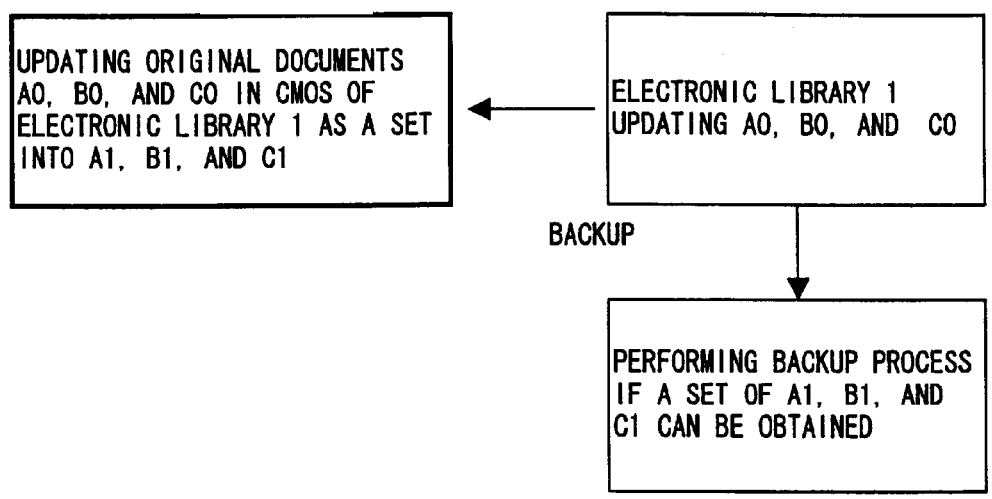
FIG. 24 shows the concept of the process performed when a transaction process is stored.

FIG. 24 shows the concept of the process performed when a transaction process is performed.

FIG. 25 shows a transaction process and a backup process (2).

FIG. 25 shows the relationship between a transaction process and a backup process. First, the documents A0, B0, and C0 are sequentially obtained by Begin Transaction, and then updated. Then the process terminates with Commit. Assume that the document D0 is subject to an updating process. When it is copied for backup, the documents A1 through D1 obtained after the updating process are sequentially obtained. In this case, also assume that the document C1 cannot be obtained. That is, it is assumed that the document C1 has been referenced in another process. Then, the backup process is suspended for the documents A1 through C1 which are associated with each other in a series of processes, and a backup process is performed only on the document D1 generated independent of these documents. Then, the documents A1 through D1 are released. In this process, only the document D1 is copied for backup.

As described above, the documents A1 through C1 generated and updated as being associated with each other in the transaction encompassed by Begin Transaction and Commit can be prevented from being destroyed in consistency in the backup process by allowing the backup process to be performed only when all of the documents can be obtained.

FIG. 26 shows the configuration of the hardware of an electronic library required to realize the process according to an embodiment of the present invention by a program (software).

A CPU 11 is connected to ROM 12, RAM 13, an communications interface 14, C-MOS memory 15, a storage medium 19, a storage medium reading device 20, and an input/output device 22 through a bus 10. With such an electronic library, an electronic library to be stored is stored on the storage medium 19 such as a hard disk, etc. and a portable storage medium 21 such as an MO, a floppy disk, etc. The CPU 11 directly accesses an electronic library in the storage medium 19 through the bus 10 to perform a sweeping process and a backup process. A destination medium for the sweeping and backup processes can be, for example, the portable storage medium 21. The portable storage medium 21 receives access from the CPU 11 through the storage medium reading device 20. The electronic library can also be stored in the RAM 13. However, since the RAM 13 is volatile memory, the electronic library has to be stored on the storage medium 19 or the portable storage medium 21 for semipermanent storage. The C-MOS memory 15 according to the above described embodiment temporarily stores the information as to which electronic library stored the backup data. The C-MOS memory 15 is volatile memory as the RAM 13 shown in FIG. 26, and can be replaced with the RAM 13.

The ROM 12 stores BIOS for basic input and output for an electronic library. A user inputs an instruction to perform a backup process to the CPU 11 from the input/output device 22, and allows an instruction to sweep data and a result of the process performed by the CPU 11 to be presented to the user. The input/output device 22 comprises a display, a mouse, a keyboard, etc. In addition, an electronic library storing process, a document managing process, a sweeping process, a backup process as basic processes for handling an electronic library, or a program for generation of a sweep history file and a backup history file can be stored in the ROM 12 for execution. It is obvious that the program for performing these processes can be stored on the storage medium 19 and the portable storage medium 21 so that the CPU 11 can develop the program in the RAM 13, thereby allowing the above mentioned processes to be performed.

Furthermore, an electronic library can be provided with the communications interface 14 for connection to a database 18 such as another electronic library, etc. through a network 17. In this case, when the capacity of the storage medium 19 become full, or the portable storage medium 21 cannot be used, a backup file of a document to be swept or a document to be copied for backup can be stored in the database 18 such as another electronic library, etc. through the network 17.

Furthermore, a program for performing a storing, managing, sweeping, and backup processes for an electronic library which are related to the embodiments of the present invention can be downloaded from the database 18 such as another electronic library, etc. through the network 17 so that the CPU 11 can execute the program. Otherwise, when the network 17 is configured as a LAN, etc., an electronic library can be managed in a network environment.

In the above mentioned embodiment of the present invention, the encrypting process is not described in detail, but it is well-known to provide a unique ID for an electronic library which is an information processing device. Since a practical method such as a DES, etc. for encryption is also well-known, one of ordinary skill in the art can easily realize the method.

According to the present invention, a sweeping technology for effectively utilizing a disk capacity can be provided, while the sweeping technology for guaranteeing the originality has not been completely developed in conventional technology.

According to the present invention, a backup method for guaranteeing the originality while maintaining the performance can be provided, while the backup technology for guaranteeing the originality has not been completely developed in conventional technology.

What is claimed is:

1. A file management apparatus, comprising:

a storage unit storing an electronic file;

a process unit selecting one of a file relocation process and a file backup process with respect to the electronic file and performing the selected one of the file relocation process and the file backup process with respect to the electronic file;

a history generation unit generating and storing a history file recording an history of the electronic file processed with the one of the file relocation process and the file backup process;

a storage unit storing the history file; and a restoration unit reviewing the history file when restoring the electronic file that has been subjected to the one of the file relocation process and the file back-up process and restoring the electronic file when the file is found to have been subjected to the file backup process and not to the file relocation process.

2. The apparatus according to claim 1, wherein said relocation process is an electronic file sweeping process performed on the electronic file.

3. The apparatus according to claim 2, wherein there are a first mode in which an operation of registering, updating, and referencing the electronic file, etc., and a number of the operation are managed and an entire sequence of one electronic file is swept, and a second mode in which only a latest electronic file of one electronic file is swept.

4. The apparatus according to claim 2, wherein said history file stores an identifier of a source medium for the sweeping process, and when a swept electronic file is restored, the file is restored on a medium specified by the identifier.

5. The apparatus according to claim 2, wherein an electronic file to be swept is encrypted using a key unique to said file management apparatus.

6. The apparatus according to claim 2, wherein when a series of related electronic files are swept, a sweeping process is suspended when there is any electronic file which cannot be swept in the series of related electronic files.

7. The apparatus according to claim 2, wherein when an electronic file whose sweep history is recorded in said history file is detected in restored electronic files when a restoring process is performed, the electronic file whose sweep history is recorded is deleted from a destination medium for a restoring process.

8. The apparatus according to claim 1, wherein the one of the file relocation process and the file backup process is a backup process.

9. The apparatus according to claim 8, wherein said history file stores a sweeping process history in addition to a backup history, when an electronic file is restored from a backup medium, the sweeping process history is first restored, and an electronic file stored in the sweep history is deleted after the electronic file is restored.

10. The apparatus according to claim 8, wherein said history file stores information about a backup file, and an identifier of a destination medium for the backup process.

11. The apparatus according to claim 10, wherein said history file stores an identifier of a source medium for the backup process.

12. The apparatus according to claim 8, wherein said electronic file is copied for backup after being encrypted using a key unique to said file management apparatus as a backup source.

13. The apparatus according to claim 8, wherein said backup process has an entire backup mode in which all electronic files stored in said storage unit are copied for backup, and a difference backup mode in which only a difference from previous backup data is copied for backup.

14. The apparatus according to claim 13, wherein said backup process extracts electronic files to be handled in a difference backup process, sets the backup process in a wait state until the electronic files can be accessible if the files are not accessible, and copies for backup only accessible electronic files in the electronic files to be handled in the difference backup process.

15. The file management apparatus according to claim 8, wherein when a series of related electronic files are copied for backup, the backup process is suspended when there is any electronic file which cannot be copied for backup in the series of related electronic files.

16. A file managing method, comprising:

storing an electronic file;

performing one of a file relocation process and a file backup process on the electronic file;

generating a history file recording a history of the electronic file processed with the one of the file relocation process and the file backup process;

storing the history file; and reviewing the history file when restoring the electronic file and restoring the electronic file when the file is found to have been subjected to the file backup process and not to the file relocation process.

17. The method according to claim 16, wherein the one of the file relocation process and the file backup process is an electronic file sweeping process.

18. The method according to claim 17, wherein there are a first mode in which an operation of registering, updating, and referencing the electronic file, etc., and a number of the operation are managed and an entire sequence of one electronic file is swept, and a second mode in which only a latest electronic file of one electronic file is swept.

19. The method according to claim 17, wherein said history file stores an identifier of a source medium for the sweeping process, and when a swept electronic file is restored, the file is restored on a medium specified by the identifier.

20. The method according to claim 17, wherein an electronic file to be swept is encrypted using a key unique to said file management apparatus.

21. The method according to claim 17, wherein when a series of related electronic files are swept, the sweeping process is suspended when there is any electronic file which cannot be swept in the series of related electronic files.

22. The method according to claim 17, wherein when an electronic file whose sweep history is recorded in said history file is detected in restored electronic files when a restoring process is performed, the electronic file whose sweep history is recorded is deleted from a destination medium for the restoring process.

23. The method according to claim 16, wherein the one of the file relocation process and the file backup is a backup process.

24. The method according to claim 23, wherein said history file stores a sweeping process history in addition to a backup history, when an electronic file is restored from a backup medium, a sweeping process history is first restored, and an electronic file stored in the sweep history is deleted after the electronic file is restored.

25. The method according to claim 23, wherein said history file stores information about a backup file, and an identifier of a destination medium for the backup process.

26. The method according to claim 25, wherein said history file stores an identifier of a source medium for the backup process.

27. The method according to claim 23, wherein said electronic file is copied for backup after being encrypted using a key unique to said file management apparatus as a backup source.

28. The method according to claim 23, wherein said backup process has an entire backup mode in which all electronic files stored in said storage unit are copied for backup, and a difference backup mode in which only a difference from previous backup data is copied for backup.

29. The method according to claim 28, wherein said backup process extracts electronic files to be handled in a difference backup process, sets the backup process in a wait state until the electronic files can be accessible if the files are not accessible, and copies for backup only accessible electronic files in the electronic files to be handled in the difference backup process.

30. The method according to claim 23, wherein when a series of related electronic files are copied for backup, the backup process is suspended when there is any electronic file which cannot be copied for backup in the series of related electronic files.

31. A computer-readable storage medium storing a program for realizing a method for managing a file, comprising:

storing an electronic file;

performing one of a file relocation process and a file backup process on the electronic file;

generating a history file recording a history of the electronic file processed with the one of the file relocation process and the file backup process;

storing the history file; and reviewing the history file when restoring the electronic file and restoring the electronic file when the file is found to have been subjected to the file backup process and not to the file relocation process.

32. The medium according to claim 31, wherein the one of the file relocation process and the file backup process said process is an electronic file sweeping process.

33. The medium according to claim 32, wherein there are a first mode in which an operation of registering, updating, and referencing the electronic file, etc., and a number of the operation are managed and an entire sequence of one electronic file is swept, and a second mode in which only a latest electronic file of one electronic file is swept.

34. The medium according to claim 32, wherein said history file stores an identifier of a source medium for the sweeping process, and when a swept electronic file is restored, the file is restored on a medium specified by the identifier.

35. The medium according to claim 32, wherein an electronic file to be swept is encrypted using a key unique to said file management apparatus.

36. The medium according to claim 32, wherein when a series of related electronic files are swept, the sweeping process is suspended when there is any electronic file which cannot be swept in the series of related electronic files.

37. The medium according to claim 32, wherein when an electronic file whose sweep history is recorded in said history file is detected in restored electronic files when a restoring process is performed, the electronic file whose sweep history is recorded is deleted from a destination medium for the restoring process.

38. The medium according to claim 31, wherein the one of the file relocation process and the file backup process is a backup process.

39. The medium according to claim 38, wherein said history file stores a sweeping process history in addition to a backup history, when an electronic file is restored from a backup medium, a sweeping process history is first restored, and an electronic file stored in the sweep history is deleted after the electronic file is restored.

40. The medium according to claim 38, wherein said history file stores information about a backup file, and an identifier of a destination medium for the backup process.

41. The medium according to claim 40, wherein said history file stores an identifier of a source medium for the backup process.

42. The medium according to claim 38, wherein said electronic file is copied for backup after being encrypted using a key unique to said file management apparatus as a backup source.

43. The medium according to claim 38, wherein said backup process has an entire backup mode in which all electronic files stored in said storage unit are copied for backup, and a difference backup mode in which only a difference from previous backup data is copied for backup.

44. The medium according to claim 43, wherein said backup process extracts electronic files to be handled in a difference backup process, sets the backup process in a wait state until the electronic files can be accessible if the files are not accessible, and copies for backup only accessible electronic files in the electronic files to be handled in the difference backup process.

45. The medium according to claim 38, wherein when a series of related electronic files are copied for backup, the backup process is suspended when there is any electronic file which cannot be copied for backup in the series of related electronic files.

46. A file managing method associated with a file management apparatus, comprising:

storing an electronic file;

performing a file process on the electronic file to store the file on a storage medium, the file process comprising one of a file relocation process and a file back-up process, the file process encrypting the file with an encryption key of the file management apparatus, the file process storing an identification code of the file management apparatus with the file being stored on the storage medium;

generating a history file recording a history of the electronic file processed with the file process and including the identification code;

storing the history file; and reviewing the history file when restoring the electronic file and restoring the electronic file when the file is being restored by the file management apparatus having the identification code of the file.

47. A file managing method associated with a file management apparatus, comprising:

storing an electronic file;

performing a file process on the electronic file to store the file on a storage medium, the file process comprising one of a file relocation process and a file back-up process, the file process storing an identification code of the file management apparatus with the file being stored on the storage medium;

generating a history file recording a history of the electronic file processed with the file process and including the identification code;

storing the history file; and reviewing the history file when restoring the electronic file and restoring the electronic file when the file is being restored by the file management apparatus having the identification code of the file.

48. A file management apparatus for storing an electronic file on a storage medium, comprising:

a storage unit storing the electronic file; and a process unit performing a file process on the electronic file to store the file on the storage medium from the storage unit, the file process comprising one of a file relocation process and a file back-up process, the file process encrypting the file with an encryption key of the file management apparatus, the file process storing an identification code of the file management apparatus with the file being stored on the storage medium, the process unit generating a history file recording a history of the electronic file processed with the file process and including the identification code and storing the history file in the storage unit, and the process unit reviewing the history file when restoring the electronic file from the storage medium to the storage unit and restoring the electronic file to the storage unit when the file is being restored by of the file management apparatus having the identification code of the file.

49. A file management apparatus for storing an electronic file on a storage medium, comprising:

a storage unit storing the electronic file; and a process unit performing a file process on the electronic file to store the file on the storage medium from the storage unit, the file process comprising one of a file relocation process and a file back-up process, the file process storing an identification code of the file management apparatus with the file being stored on the storage medium, the process unit generating a history file recording a history of the electronic file processed with the file process and including the identification code and storing the history file in the storage unit, and the process unit reviewing the history file when restoring the electronic file from the storage medium to the storage unit and restoring the electronic file to the storage unit when the file is being restored by of the file management apparatus having the identification code of the file.

50. A file management apparatus, comprising:

a storage unit storing an electronic file;

a process unit performing one of a file relocation process and a file backup process with respect to the electronic file;

a history generation unit generating and storing a history file recording an history of the electronic file processed with the one of the file relocation process and the file backup process;

a storage unit storing the history file; and a restoration unit reviewing the history file when restoring the electronic file that has been subjected to the one of the file relocation process and the file back-up process, having a back-up only mode where a determination is made as to whether the file has been subjected to the file backup process and not to the file relocation process and where the electronic file is restored when the file is found to have been subjected to the file backup process and not to the file relocation process.

51. A file management apparatus, comprising:

a storage unit storing an electronic file;

a process unit performing one of a file relocation process and a file backup process with respect to the electronic file where only a single version of a backed up file is maintained;

a history generation unit generating and storing a history file recording an history of the electronic file processed with the one of the file relocation process and the file backup process;

a storage unit storing the history file; and a restoration unit reviewing the history file when restoring the electronic file that has been subjected to the one of the file relocation process and the file back-up process and restoring the electronic file when the file is found to have been subjected to the file backup process and not to the file relocation process.

52. A file management apparatus, comprising:

a storage unit storing an electronic file;

a process unit performing one of a file relocation process and a file backup process with respect to the electronic file;

a history generation unit generating and storing a history file recording an history of the electronic file processed with the one of the file relocation process and the file backup process using a process identifier;

a storage unit storing the history file; and a restoration unit reviewing the history file when restoring the electronic file that has been subjected to the one of the file relocation process and the file back-up process and restoring the electronic file when the file is found to have been subjected to the file backup process and not to the file relocation process.

* * * * *